United States Patent [19]

Unger et al.

[11] Patent Number: 4,911,388
[45] Date of Patent: Mar. 27, 1990

[54] CABLE MOUNTING BRACKET

[75] Inventors: John Unger, Elmhurst; John Muntean, Chicago, both of Ill.

[73] Assignee: Reliance Comm/Tec Corporation, Franklin Park, Ill.

[21] Appl. No.: 316,814

[22] Filed: Feb. 28, 1989

[51] Int. Cl.$^4$ .................................................. F16L 3/08
[52] U.S. Cl. ..................................... 248/74.3; 248/75; 248/300
[58] Field of Search ................... 248/74.1, 74.2, 74.3, 248/73, 65, 67.7, 75, 300; 24/274 R

[56] References Cited

U.S. PATENT DOCUMENTS

| | | | |
|---|---|---|---|
| 2,834,566 | 5/1958 | Bower | 248/300 X |
| 2,936,982 | 5/1960 | Cushenberry | 248/74.3 |
| 4,006,874 | 2/1977 | McGee | 248/74.3 |
| 4,429,497 | 2/1984 | Dibernardi | 248/73 X |
| 4,637,100 | 1/1987 | Ishihata | 24/274 R |
| 4,795,114 | 1/1989 | Usui et al. | 248/74.1 X |

*Primary Examiner*—Ramon O. Ramirez
*Attorney, Agent, or Firm*—R. A. Blackstone, Jr.

[57] ABSTRACT

A cable mounting bracket device for mounting a multiconductor telecommunications cable to a connector block to support the cable thus relieving strain on the multiple conductors leading from the cable to the connector block. The cable mounting bracket device allows the cable to be easily reoriented to accommodate various installation restrictions and/or requirements. The bracket portion of the cable mounting bracket device does not have any moving parts. The device includes only three main components including a bracket, a cable securing clamp and fasteners which secure the bracket to the connector block or another surface. The bracket is generally T-shaped having a mounting portion and two perpendicularly extending cable mounting extremity portions which are cantilevered off the mounting portion.

14 Claims, 1 Drawing Sheet

U.S. Patent       Mar. 27, 1990       4,911,388
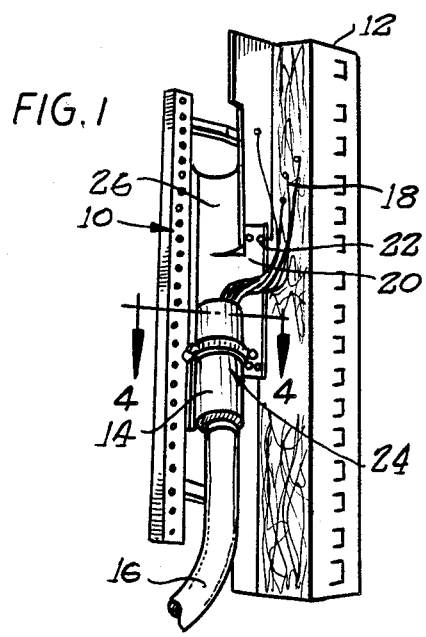
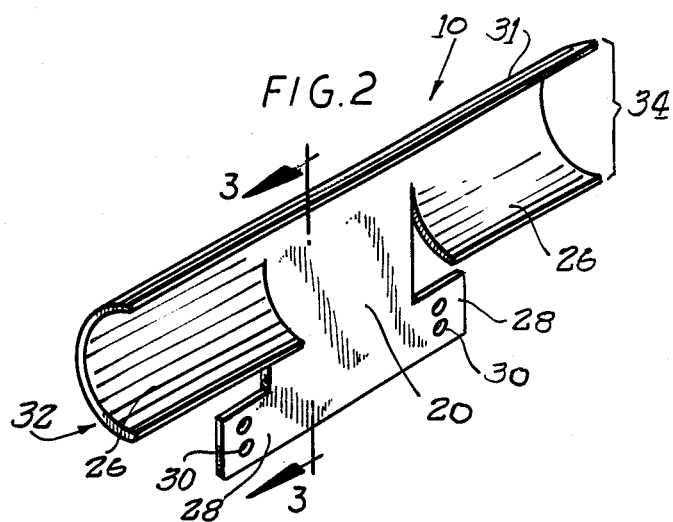
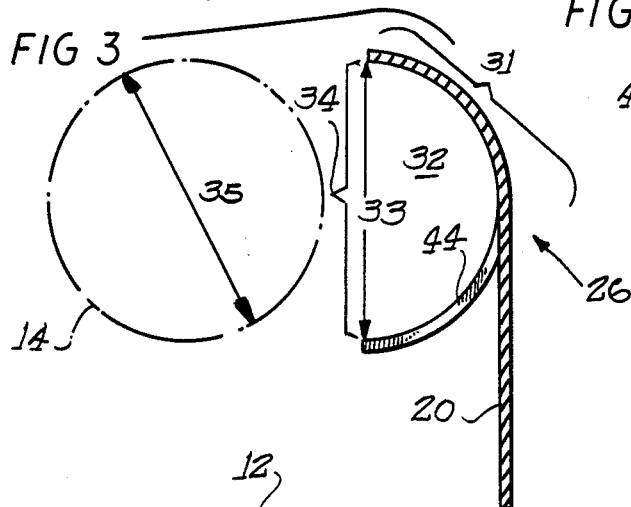
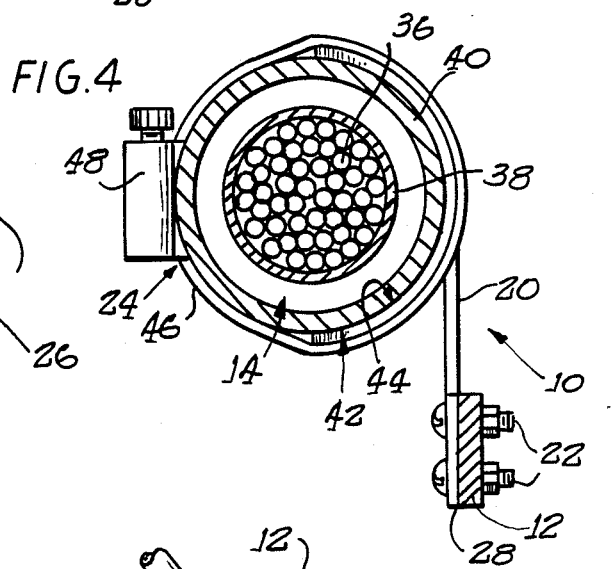
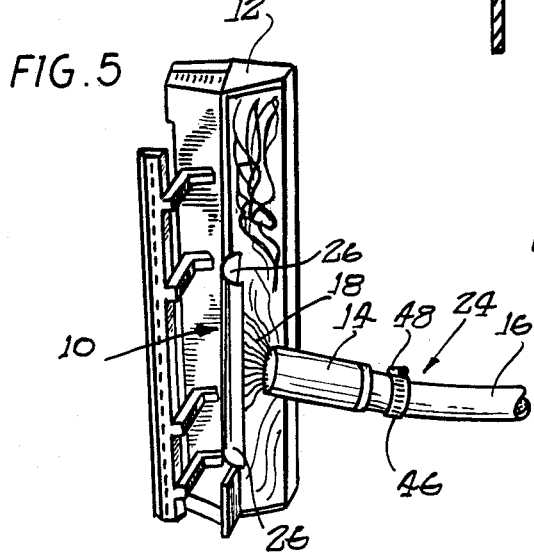
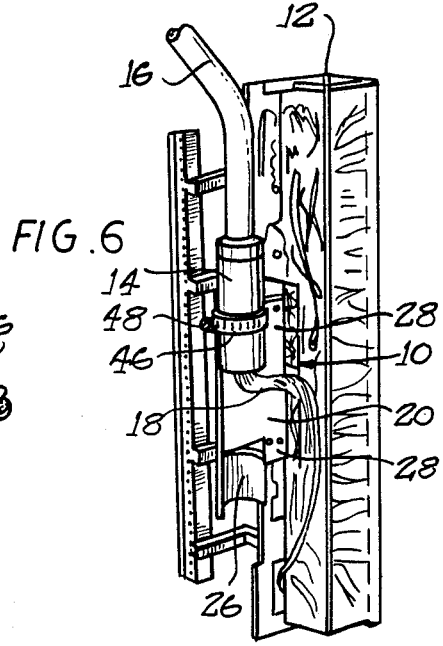

CABLE MOUNTING BRACKET

BACKGROUND OF THE INVENTION

This invention relates to a cable mounting bracket for use in releasably mounting a cable stub to the frame of a central office connector terminal block which also provides for easily changing the direction in which the cable stub extends from the frame.

While the invention may be useful in a variety of applications, the ensuing description will be facilitated by specific reference to the problem of easily changing the direction of the cable stub mounted to the cable mounting bracket.

Telephone terminal blocks are commonly installed in buildings which are serviced by numerous telecommunication lines. Such telephone terminal blocks are commonly referred to as central office connectors since the telephone lines are brought into the central area for the entire office and connected into one telephone terminal block or group of blocks. These central office connectors, which are an assembly of cables, electrical connectors and other hardware, are usually installed in specific areas within the central office. This area can be needed to install and direct incoming outside plant cable.

In many office settings, such as in large buildings, many terminal blocks may be installed within the same area so as to consolidate the telecommunications services. Usually, at least one multi-wired telecommunications service cable is connected to each central office connector. These large service cables may be comprised of one hundred or more individual conductor wires which are to be connected to a terminal block as prescribed by the needs of the telecommunications user.

To expedite the installation of such central office connectors, the terminal blocks are often prefabricated to the extent that all of the wire-runs to the appropriate terminal connectors are prewired according to the customer's specifications and all wires are terminated in a cable stub prior to installation in the customer's building. Such a prefabricated central office connector allows for simplified installation by merely installing the prefabricated central office connector and connecting the multi-conductor cable stub to the appropriate incoming and/or outgoing cable. The cable stub may also be preconnectorized if desired.

Typically, the large multi-conductor cable stub is mounted to the frame of the central office connector during the prefabrication process with an downwardly directed cable end. The downwardly directed orientation of the multi-conductor cable is used because this is the most common cable entry orientation in a telecommunications service installation. However, some service installations, due to space constraints or installation requirements, dictate that the downwardly directed orientation of the multi-conductor cable stub be changed to a upwardly directed orientation.

Reorientation of the multi-conductor cable stub is a problem for most prior art central office connectors. Hence, most prior art connectors use several removable clamps to hold the cable stub to the connector frame. The brackets used to hold the cable to the frame have loose hardware comprised of a threaded fastener which is removed from a nut or a threaded aperture in the connector frame in order to remove the clamps and change the orientation of the multi-conductor cable. Changing the orientation of the multi-conductor cable is difficult in locations where the amount of space in which an installer operates is limited. This difficulty is exacerbated by the fact that loose hardware and removable clamps sometimes fall off of the central office connector and must be located and attempted to be removed from cramped areas or worse, may be lost or unaccessible in the restrictive confines of some installation locations.

In an attempt to solve these problems, a rotatably pivotable bracket was designed to allow the multi-conductor cable stub to be rotatably pivoted while securely held within a bracket which was attached to the central office connector frame. Even though this device has captive hardware, and therefore reduces the possibility and problem of losing hardware, it creates several other problems. First, the multi-conductor cable stub which attaches to the rotatably pivotable bracket is held in an essentially fixed position relative to the frame. This fixed position of the cable stub often places excessive stresses on the individual wires attached to the central office connectors when the cable is rotated from one direction to another. Such excessive stress could result in conductor failure.

Another problem with the rotatably pivotable bracket is that it is a very expensive piece of hardware to fabricate and contains movable parts which increases the possibility of damage or misuse of the bracket. The rotatably pivotable bracket is expensive since it is made of a die-cast angle portion and a die-cast frame mounting portion which has a grooved sleeve mounted therebetween to facilitate rotation. If for some reason the ball bearings within the bracket malfunction, it would be impossible to pivot the cable into a different position.

OBJECTS OF THE INVENTION

A general object of the invention is to provide a bracket to support a cable stub in one of at least two positions while providing the ability to easily change the direction from which the cable stub feeds multiple conductors to a terminal block to which the bracket is mounted without unnecessarily stressing the cable connections to the terminal block.

Another object of this invention is to provide an inexpensive cable securing bracket which facilitates changing the directional orientation of a cable stub releasably mounted thereto without moving parts.

A more specific object of this invention is to provide a stationary single piece bracket which does not require any moving bracket parts to change cable direction and is capable of securely holding a cable stub with but a single piece of captive hardware.

In accordance with the foregoing, the present invention comprises a cable mounting bracket device for releasably mounting a multi-conductor telecommunications cable to a connector block and for supporting said cable to relieve strain on the multiple conductors which are connected to terminals within the connector block and which permits the direction in which the mounted cable extends from the connector block to be quickly and easily reoriented to accommodate various installation restrictions and requirements. The cable mounting bracket comprises; mounting means for securing the bracket to the connector block; at least two cable mounting extremity means are attached to and extending from the mounting means for mounting the cable; releasable cable securing means releasably coupled with at least one of the cable mounting extremity means for releasably securing the cable to the cable mounting extremity means; the releasable cable securing means being disengageable from the cable mounting extremity means for releasing the cable mounting to a first of the cable mounting extremity means to permit the cable to be reoriented and mounted to a second of the cable mounting extremity means.

BRIEF DESCRIPTION OF THE DRAWINGS

The features of the present invention which are believed to be novel are set forth with particularity in the appended claims. The organization and manner of the operation of the invention, together with the further objects and advantages thereof may best be understood by reference to the following description, taken in connection with the accompanying drawing in which like reference numerals identify like elements, and in which:

FIG. 1 is a perspective view of the cable mounting bracket mounted to the frame of a central office connector and to which a cable stub is secured;

FIG. 2 is a perspective view of the cable mounting bracket showing the curved shape of the oppositely directed cantilevered cable mounting members and the manner in which these members are formed with an integral mounting plate;

FIG. 3 is a sectional view taken along the line 3—3 in FIG. 2 showing the curved cable mounting bracket and the manner in which it cooperatively mates with the cable stub;

FIG. 4 is a sectional view taken along the line 4—4 in FIG. 1 showing a cable stub mounted in the bracket and secured in place by a worm gear actuated clamp;

FIG. 5 is a perspective view which shows the clamp loosened from the cable stub and pushed away from the cable stub along the cable, thereby releasing the cable stub from the bracket and allowing the cable stub to be pivoted about the bracket to change the orientation of the cable stub in relation to the central office connector; and FIG. 6 is a perspective view which shows the clamp resecured to the cable mounting bracket and cable stub to secure the stub in the newly positioned orientation.

DETAILED DESCRIPTION OF THE ILLUSTRATED EMBODIMENT

While this invention is susceptible to embodiment in many different forms, there is shown in the drawings and will be herein described in detail one specific embodiment with the understanding that the present disclosure is to be considered an exemplification of the principles of the invention, and is not intended to limit the invention to the embodiment illustrated.

FIG. 1 provides a perspective view of a cable mounting bracket 10 mounted to a connector block 12 which securely retains a potted cable stub 14 of a multi-conductor telecommunications cable 16 to prevent overstressing multiple conductors 18 which are attached to the connector block 12. Connection of the mounting bracket 10 to the connector block 12 is achieved by mounting means 20 which receives fasteners 22 for mechanically fastening the mounting bracket 10 to the connector block 12. An alternative form (not shown) of securing the cable mounting bracket 10 to the connector block 12 is by using an adhesive between the abutting surfaces of the mounting means 20 and the connector block 12 thereby eliminating the need for the fasteners 22. While the cable mounting bracket 10 is shown in FIG. 1 to be connected to the connector block 12, if required, the cable mounting bracket 10 may be mounted to another surface as long as the multiple conductors 18 are well within easy attaching distance to their respective terminals in the connector block 12.

Shown in FIG. 1 in an downwardly directed mounting position, the potted cable stub 14 of the multi-conductor telecommunications cable 16 is secured to the cable mounting bracket 10 by a releasable cable securing means 24. As shown in the illustrated embodiment, the releasable cable securing means 24 is a cable clamp which is easily tightened for mounting the cable stub 14 to the bracket 10.

As shown in FIG. 2, the bracket 10 is generally formed in a T-shape with the mounting means 20 generally forming the vertical or upright or central portion of the T-shape and a pair of cable mounting extremity means 26 cantilevered from the mounting means 20 forming the horizontal or cross-bar portion of the T-shape. The cable mounting extremity means or extremity means 26 are generally non-planar and preferably, formed to cooperatively mate with the cable stub 14 which is to be mounted thereto. A pair of fastening wings 28 extend perpendicularly away from the mounting means 20 and generally parallel to the extremities 26 and are formed with fastening means receiving apertures 30 therethrough through which fasteners 22 are inserted to mount the bracket 10 to the connector block 12.

While each fastening wing 28 is shown in FIG. 2 as being approximately half the length of a cable mounting extremity 26, the fastening wings 28 can be completely eliminated such that they do not protrude perpendicularly away from the mounting means 20. When the fastening wings 28 are eliminated, the fastening means receiving apertures 30 can be formed through the surface of the mounting means 20. Alternatively, where additional mechanical advantage is required, the fastening wings 28 may be extended to the length of each cable mounting extremity 26 or beyond. However, in practical manufacturing terms, the fastening wings 28 will most likely be limited to a length equal to a cable mounting extremity 26 because in this way the entire bracket 10 may be formed from a single generally rectangular sheet of metal.

Shown generally in FIG. 2 and better shown in FIG. 3, (a cross section along the line 3-3 in FIG. 2) a portion of the bracket 10 is continuous from one end of a cable mounting extremity 26 to the other end of a cable mounting extremity 26. As shown in the cross-section in FIG. 3, the mounting means and the attached cantilevered portion of each cable mounting extremity 26 is an uninterrupted piece of material 31. The continuous nature of this portion of the bracket 10 provides continuous flexion-resisting strength.

Advantageously, the illustrated bracket 10 may be simply and economically formed from a flat sheet material. The configuration of the initial T-shape, as well as the fastening wings 28 and apertures 30 may be formed by stamping. The accurate or semi-circular shape of the cable mounting extremities 26 may be achieved by a further cold forming operation, which will also initially sever or cut inner edges thereof where they initially meet the central, flat mounting means portion 20 (i.e., in the initial stamping), to allow the illustrated shaping or formation of extremities 26.

As shown in FIG. 2 and FIG. 3, the cable mounting extremity means 26 are formed with a generally non-planar cross-section 32. The cross-section 32 of the illustrated embodiment is generally a semi-circular shape which cooperatively mates with the generally circular cross-section of the cable stub 14. The cross section 32 of the bracket 10 is not intended to be restricted to a semi-circular form such that the cross-section could be a "V" shape, a generally rectangular shape with one open side or any other shape which conveniently mates with a corresponding cable stub.

Additionally, the cross-section 32 of the extremity means 26 is not required to have a relatively large open end 34, as shown in the illustrated embodiment of FIG. 2 and 3, and may be formed with a smaller opening which assists in retaining the cable stub 14. The illustrated embodiment, however, is dimensioned and formed with a cross-section 32 which has an inside diameter 33 which is approximately equal to the outside diameter 35 of the cable stub 14 mounted thereagainst.

FIG. 4 is a sectional view taken along the line 4—4 in FIG. 1 showing the cable stub 14 mounted in the bracket 10 and securely retained by the releasable cable securing means 24. The cable stub 14 consists of a group of conductors 36 which are surrounded by a cable insulation material 38 which in turn is embedded or potted in a cable stub potting compound 40. While a generally circular cross-sectional cable is most likely to be used in the envisioned applications, it is the cable potting compound 40 which may have a cross-section other than the circle which would dictate having a cable mounting extremity 26 cross-section 32 other than a semi-circle.

As shown in FIG. 4, the outside surface 42 of the cable stub 14 cooperatively mates with the inside surface 44 of the extremity means 26 and is held in place by the releasable cable securing means 24. The releasable securing means 24 includes clamping means 46 and tightening means 48. In the illustrated embodiment, the releasable cable securing means 24 is a cross-slotted flexible metal band or clamping means which is tightened by a worm gear actuated tightening means 48. This type of cable clamp 24 is convenient because it remains captive about the cable stub 16 and/or extremity 26 when the clamping means 46 is loosened thereby preventing the possibility of losing the securing means 24. While other forms of securing means 24 may be utilized in the cable stub 14 securing application, the worm gear urged tightening means 48 and flexible clamping means 46 are used because this combination provides mechanical advantage in tightening the cable stub 14 against the cable mounting extremity 26, the clamping means 46 flexes to conform to any irregularities and the cable stub potting compound 40 or the cable mounting extremity 26 and is captively retained when loosened.

Also shown in the cross-section of FIG. 4 are the cable mounting fastening means 22 mounting the fastening wings 28 of the mounting means 20 to a portion of the connector block 12. In FIG. 4, the fastening means 22 are shown as a threaded nut and bolt combination, however, other forms of fasteners may be used in this application. As an alternative, as mentioned above, the bracket 10 may be affixed to a surface other than the connector block 12 and/or affixed with an adhesive such that either surface of the mounting means 20 could be adhered to another surface. Also, where necessary, the threaded nut and bolt fasteners shown in FIG. 4 could be replaced by other types of fasteners which could be inserted from either side of the mounting means depending upon the mounting application. While the above-mentioned alternatives are viable alternatives, the preferred application uses the form of fastening means shown. Moreover, in applications where the bracket 10 is required to be removed from the connector block 12 or the mounting surface, the fastener means could also include retaining means such that when the bracket 10 is removed, the fastening means will be retained within the fastening means-receiving apertures 30 or be retained captively held in some other fashion to the mounting means 20.

FIG. 5 illustrates the application of the features of the bracket when the orientation of the cable needs to be changed from a downward orientation, as shown in FIG. 1, to a upward orientation, as shown in FIG. 6. To change the orientation of the cable 16, the tightening means 48 of the releasable cable securing means 24 is moved to loosen the clamping means 46 thereby loosening the cable stub 14 from the mounting extremity 26. Once sufficiently loosened, the cable securing means 24 can be urged upward thereby becoming disengaged from the cable mounting extremity 26 such that the cable stub 14 can be removed from the cable mounting extremity 26. With reference to FIG. 5, even in the loosened position, the releasable cable securing means 24 is captively retained on the cable 16. By being able to completely disengage the cable stub 14 from the cable mounting extremity 26, the cable can be slowly moved to work the multiple conductors 18 into a new position without over-stressing the multiple conductors 18, thereby retaining the operating integrity of the conductor connections to the connector block 12. Also, it should be noted that none of the parts of the bracket move during the cable 16 reorientation procedure thereby eliminating any lost parts, moving part maintenance or potential failure.

Once positioned against the desired cable mounting extremity 26, the cable stub 14 is once again secured to the bracket 10 by urging the releasable cable securing means 24 down over the outside surface of the cable mounting extremity 26 and the outside surface of the cable stub 14. Once the cable stub 14 is properly positioned, the tightening means 48 are once again adjusted to apply the necessary clamping force to the clamping means 46 to securely retain the cable 16 in the newly positioned orientation. The entire cable mounting bracket is comprised of a minimal number of parts including a bracket portion 10, a releasable cable securing means 24 and bracket mounting fasteners 22.

While particular embodiments of the present invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent after study. As such, the scope of the invention should not be limited by the particular embodiment and specific construction described herein, but should be defined in the depended claims and equivalents thereof. Accordingly, the aim of the appended claims is to cover all such changes and modifications as fall within the true spirit and scope of the invention.

What is claimed is:

1. A cable mounting bracket device for releasably mounting a multi-conductor telecommunications cable to a connector block and for supporting said cable to relieve strain on multiple conductors emanating from said cable which are connected to terminals within said connector block and which permits the direction in which the mounted cable extends from the connector block to be quickly and easily reoriented to accommodate various installation restrictions and requirements while said cable mounting bracket is fixedly attached to said connector block; said cable mounting bracket comprising: mounting means for securing said bracket to said connector block; at least two cable mounting extremity means attached to and extending in different directions from said mounting means for mounting said cable in one of two different orientations corresponding to said different directions; releasable cable securing means releasably coupled with at least one of said cable mounting extremity means for releasably securing said cable to said cable mounting extremity means; said releasable cable securing means being replaceably disengageable from said cable mounting extremity means for releasing said cable mounted to a first of said at least two cable mounting extremity means to permit said cable to be reoriented and mounted to a second of said at least two cable mounting extremity means, said cable being mounted to said second cable mounting extremity means by replacing and engaging said cable securing means.

2. A cable mounting bracket device according to claim 1 wherein said mounting means comprises a plate member with a surface through which is formed at least one aperture for receiving fastening means for mounting said cable mounting bracket device to said connector block, thereby permitting mounting of said cable proximate a selected location in a selected direction.

3. A cable mounting bracket device according to claim 1 wherein said at least two cable mounting extremity means are attached to and extend from said mounting means and define an axis generally parallel to said connector block to which said cable mounting bracket is attached.

4. A cable mounting bracket device according to claim 1 wherein said releasable cable securing means comprise clamping means shaped to cooperatively mate with a portion of the outside surface of said cable mounting extremity means and a portion of the outside surface of said multi-conductor cable mounted thereto, and tightening means for drawing said clamping means around said outside surfaces of said cable mounting extremity means and said multi-conductor cable mounted thereto.

5. A cable mounting bracket device according to claim 3 wherein said device is a generally T-shaped structure for holding said cable away from and generally parallel to a given surface of the structure to which said device attaches with said two cable mounting extremity means extending axially oppositely away from said mounting means and forming a top crossbar cantilever portion of said T-shaped structure and said mounting means attaching to and extending generally perpendicularly away from said cable mounting extremity means forming a center portion of said T-shaped structure.

6. A cable mounting bracket device as claimed in claim 1 wherein said plate member and said extremity means are a single-piece body integrally formed of rigid material.

7. A cable mounting bracket device according to claim 1 wherein each of said cable mounting extremity means comprises a curved rigid member for receiving and supporting an end part of said multi-conductor cable and having a concave surface for cooperatively engaging an external convex surface portion of said multi-conductor cable.

8. A cable mounting bracket device for releasably mounting a multi-conductor telecommunications cable to a connector block structure and for supporting said cable to relieve strain on said multiple conductors which are connected to terminals within said connector block and which permits the direction in which the mounted cable extends from the connector block to be quickly and easily reoriented to accommodate various installation restrictions and requirements while said cable mounting bracket is fixedly attached to said connector block; said cable mounting bracket comprising: a T-shaped member integrally formed of a common piece of rigid material; a cross-bar portion of said T-shaped member extending away from a central portion of said T-shaped member and having an axis generally parallel to said structure and at least two non-planar cable mounting extremity means cantilevered on said central portion and extending oppositely therefrom for mounting said cable in one of two corresponding oppositely directed orientations; said central portion of said T-shaped member forming mounting means for securing said bracket structure; releasable cable securing means releasably coupled with at least one of said non-planar cable mounting extremity means for releasably securing said cable to said non-planar cable mounting extremity means; said releasable cable securing means being disengageable from said non-planar cable mounting extremity means for releasing said cable mounted to a first of at least two non-planar cable mounting extremity means to permit said cable to be reoriented and mounted to a second of at least two non-planar cable mounting extremity means.

9. A cable mounting bracket device according to claim 8 wherein said mounting means is a planar structure with a surface through which is formed at least one aperture for receiving fastening means for mounting said cable mounting bracket to said structure, thereby permitting mounting of said cable proximate a selected location in a selected direction.

10. A cable mounted bracket device according to claim 8 wherein said mounting means comprises a non-planar structure with a surface through which is formed at least one aperture for receiving fastening means for mounting said cable mounting bracket to said connector block, thereby permitting mounting of said cable proximate a selected location in a selected direction.

11. A cable mounting bracket device according to claim 8 wherein said releasable cable securing means comprise clamping means shaped to cooperatively mate with a portion of the outside surface of said non-planar cable mounting extremity means and a portion of the outside surface of said multi-conductor cable mounted thereto, and tightening means for drawing said clamping means around said outside surfaces of said non-planar cantilevered cable mounting extremity means and said multi-conductor cable mounted thereto.

12. A cable mounting bracket device according to claim 8 wherein said plate member and said extremity means are a single-piece body integrally formed of rigid material.

13. A cable mounting bracket device according to claim 1 wherein said cable mounting bracket is formed from a common piece of material by severing an edge between said mounting means and an inside edge of said cable mounting extremity means and by forming said cable mounting extremity means into a specified cross sectional shape.

14. A cable mounting bracket device according to claim 13 in which fastening means are formed from said common piece of material by forming said fastening means in said common piece of material and bending said fastening means away from said material for facilitating fastening of said bracket device to a surface.

* * * * *